E. T. JONES.
UNDERGROUND OR UNDERWATER ANTENNA SYSTEM.
APPLICATION FILED APR. 11, 1919.

1,372,658.

Patented Mar. 22, 1921.

WITNESSES
J. B. Brady
E. C. Hanson

INVENTOR
E. T. JONES
BY
HIS ATTORNEY

UNITED STATES PATENT OFFICE.

EDWARD THOMAS JONES, OF NEW ORLEANS, LOUISIANA.

UNDERGROUND OR UNDERWATER ANTENNA SYSTEM.

1,372,658.  Specification of Letters Patent.  Patented Mar. 22, 1921.

Application filed April 11, 1919. Serial No. 289,427.

*To all whom it may concern:*

Be it known that I, EDWARD THOMAS JONES, a citizen of the United States, stationed at the United States Naval Station, New Orleans, Louisiana, have invented an Improvement in Underground or Underwater Antennæ Systems, of which the following is a specification.

My invention relates broadly to radio communication and more particularly to underground and underwater antennæ systems for radio reception or transmission.

The object of this invention is to provide an underground or underwater antennæ system utilizing concentrated energy collecting means.

In prior underground antennæ systems it has been the practice to employ buried insulated cables of great length which systems require the construction of costly trenches and occupy extensive areas.

Figure 1:
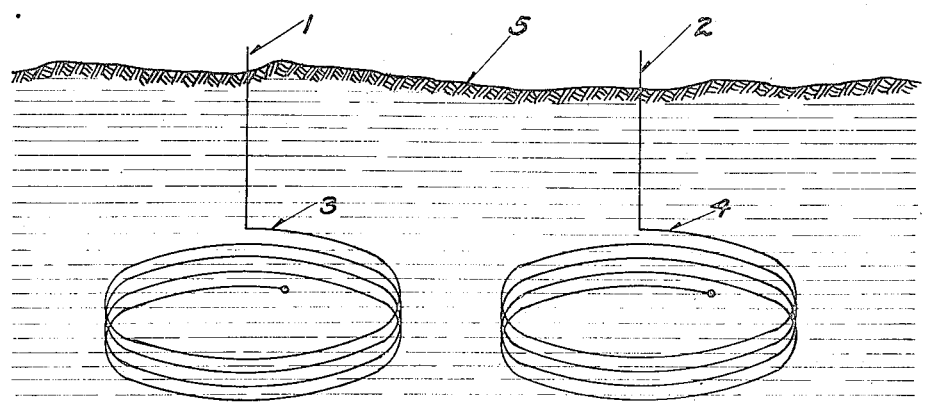

In the accompanying drawings are shown diagrammatically the electrical circuits illustrative of my invention. Figure 1 shows concentrated energy collecting means buried in the earth, and Fig. 2 discloses an oscillating radio frequency signal responsive circuit connected to the concentrated energy collecting means illustrated in Fig. 1.

As indicated in Fig. 1, concentrated energy collecting means 3 and 4 are buried in the earth 5 and electrically connected by insulated conductors 1 and 2 with the radio receiving apparatus.

In the particular drawing selected to illustrate the principle of my invention the concentrated energy collecting means 3 and 4 are shown as coils of insulated wire having the free ends suitably covered. While it will be understood that I do not limit myself specifically to this way of obtaining concentrated energy collecting means to be used as underground or underwater radio antennæ, nevertheless I have found this procedure practical in actual operation of such underground or underwater antennæ systems.

Figure 2:
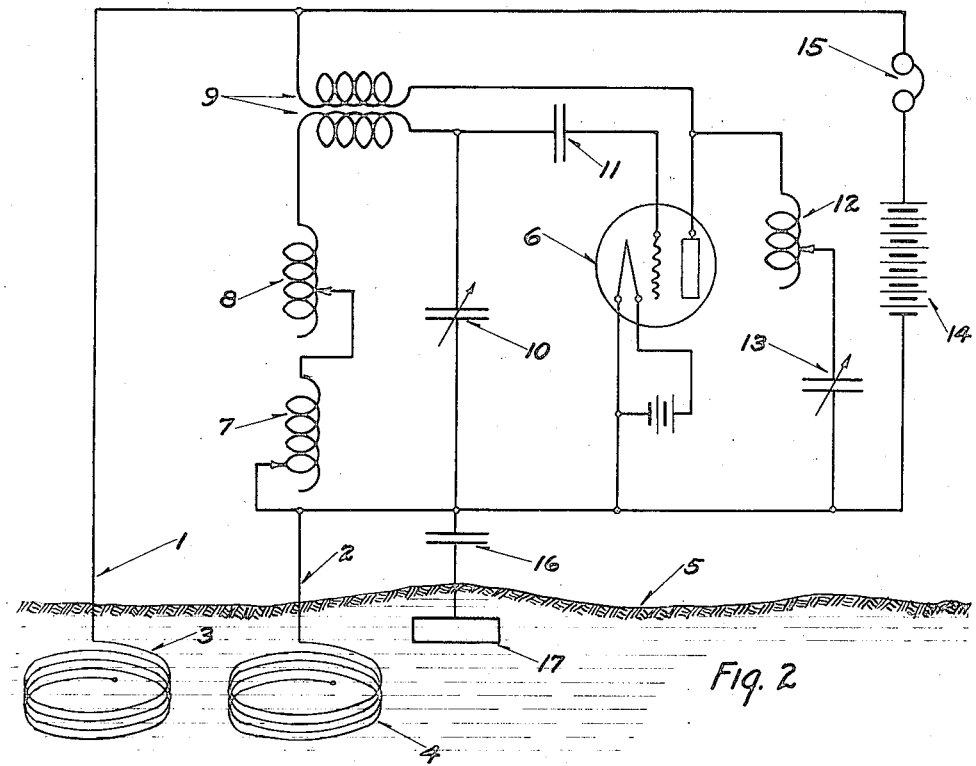

In Fig. 2 the coils 3 and 4 buried in the earth 5 are shown diagrammatically as being connected by means of insulated conductors 1 and 2 with a radio signal receiving circuit. This circuit comprises an audion detector 6, associated with the usual tuned oscillating circuit with variable condensers 10, 13, fixed condenser 11, inductances 7, 8, 9 and 12, high voltage battery 14 and a signal responsive device 15. The plate 17 buried in the earth is connected through a one microfarad condenser 16 to the tuned oscillatory circuit above described. The signal responsive device 15 may be for example, the well known telephone receiver ordinarily used in radio receiving stations.

In Figs. 1 and 2 the coils 3 and 4 are illustrated as buried in the earth 5. If desired the coils 3 and 4 may be placed in water, for example they could be submerged at a suitable depth and distance apart in a lake or river.

I have found from practical tests that it is possible to readily receive radio messages employing the system herein described at a time when it was impossible to copy radio messages using the usual form of overhead antennæ systems. Strays do not affect, to any noticeable extent, the practical operation of the underground and underwater antennæ system described, due to the concentrated form of the energy collecting means as opposed to the previous practice of employing long cable collecting means, which cables pick up increased strays in proportion to their length.

While I have shown diagrammatically the concentrated coils placed vertically in the earth it is apparent that the coils can be placed with their axes in any plane other than vertical in the earth or water.

My invention has proven highly successful in practical tests conducted at the United States Naval Station, New Orleans, Louisiana. The antennæ comprised two coils, each containing 200 feet of Packard cable, the coils having a diameter of 4 feet. These coils were placed 30 feet apart on the bed of the Mississippi River at a depth of 12 feet and leads brought to receiving apparatus on a wharf 15 feet above the surface of the water. Strong signals were received from Swan Island, Burwood, Colon Panama, Key West and Miami Florida, Arlington Virginia, Guantanamo and Moro Castle Cuba, Great Lakes Station and many ships at sea.

I have described the underground and underwater antennæ system as being connected to radio receiving apparatus but it is apparent that the antennæ system may be used for transmitting purposes and the concentrated elements employed for radiating energy without departing from the principle of my invention.

What I claim as new and desire to secure by Letters Patent of the United States, is:—

1. In an antennæ system, the combination of a plurality of energy collecting means with radio apparatus, said energy collecting means comprising simple concentrated free ended coils of insulated cable embedded in the earth.

2. In an antennæ system, the combination of a plurality of energy collecting means with radio apparatus associated therewith, said energy collecting means comprising simple concentrated free ended coils of insulated cable separated a relatively short distance apart and embedded in the earth.

3. In an antennæ system the combination with energy collecting means of a circuit therebetween, and radio apparatus therein, said energy collecting means comprising flat concentrated free ended coils embedded in the earth and connected at each end of said circuit.

EDWARD THOMAS JONES.